United States Patent
McClean et al.

(10) Patent No.: US 10,837,260 B2
(45) Date of Patent: Nov. 17, 2020

(54) CHEMICAL DEPLOYMENT MODULAR SYSTEM AND METHOD OF USE

(71) Applicants: Charles Alexander McClean, Spring, TX (US); Michael Johnson, Katy, TX (US); Lambertus Carolus Joppe, Tomball, TX (US); Roy Woudwijk, Spring, TX (US); David Alexander, Houston, TX (US)

(72) Inventors: Charles Alexander McClean, Spring, TX (US); Michael Johnson, Katy, TX (US); Lambertus Carolus Joppe, Tomball, TX (US); Roy Woudwijk, Spring, TX (US); David Alexander, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 22 days.

(21) Appl. No.: 16/146,077

(22) Filed: Sep. 28, 2018

(65) Prior Publication Data

US 2020/0102811 A1    Apr. 2, 2020

(51) Int. Cl.
*E21B 37/06*    (2006.01)
*C09K 8/524*    (2006.01)
*E21B 41/00*    (2006.01)
*E21B 17/18*    (2006.01)

(52) U.S. Cl.
CPC ............. *E21B 37/06* (2013.01); *C09K 8/524* (2013.01); *E21B 17/18* (2013.01); *E21B 41/0078* (2013.01); *C09K 2208/04* (2013.01); *C09K 2208/20* (2013.01); *C09K 2208/22* (2013.01)

(58) Field of Classification Search
CPC ........ E21B 17/046; E21B 37/06; E21B 37/08; E21B 27/00; C09K 8/524
See application file for complete search history.

(56) References Cited

U.S. PATENT DOCUMENTS

| | | | |
|---|---|---|---|
| 2,879,846 A * | 3/1959 | Dawson, Jr. .......... | E21B 21/003 166/286 |
| 5,803,175 A | 9/1998 | Myers et al. | |
| 9,097,093 B1 | 8/2015 | Frost | |
| 2006/0219409 A1 * | 10/2006 | Dyer ...................... | E21B 37/00 166/304 |
| 2012/0018142 A1 | 1/2012 | Spence | |

(Continued)

FOREIGN PATENT DOCUMENTS

EP    2336485 A2    6/2011

OTHER PUBLICATIONS

International Search Report for International Application No. PCT/US2019/047471, International Filing Date Aug. 21, 2019, dated Dec. 12, 2019, 3 pages.

(Continued)

*Primary Examiner* — Shane Bomar
(74) *Attorney, Agent, or Firm* — Cantor Colburn LLP (57) ABSTRACT

A method of treating a wellbore comprises supporting a first tubular member in a housing; coupling a second tubular member to the first tubular member via a connector; the first tubular member, the second tubular member, or both comprising a chemical deployment modular device charged with a plurality of particulates preloaded with a well treatment additive; and deploying the first and second tubular members into the wellbore.

20 Claims, 8 Drawing Sheets

(56) References Cited

U.S. PATENT DOCUMENTS

2012/0061072 A1    3/2012  Streich et al.
2012/0285695 A1*  11/2012  Lafferty .................. C09K 8/03
                                                        166/310
2015/0047842 A1*   2/2015  Hoskins ................ E21B 37/06
                                                        166/285
2016/0168952 A1*   6/2016  Qu ......................... E21B 37/06
                                                        356/316
2017/0259977 A1*   9/2017  Hall .................... B65D 75/326
2019/0169950 A1*   6/2019  Al-Qasim ........... E21B 17/1057

OTHER PUBLICATIONS

Written Opinion for International Application No. PCT/US2019/047471, International Filing Date Aug. 21, 2019, dated Dec. 12, 2019, 6 pages.

* cited by examiner

CHEMICAL DEPLOYMENT MODULAR SYSTEM AND METHOD OF USE

BACKGROUND

The disclosure is directed to chemical deployment modular systems and methods of using such systems for wellbore treatments.

Many tools used in the oil and gas industry are exposed to harsh environments. For example, tools used in a wellbore or other downhole environment are often exposed to corrosive fluids, which may cause deposits of inorganic or organic compounds such as $CaCO_3$, $BaSO_4$, $CaSO_4$, $SrSO_4$, hydrates, asphaltenes, and wax to build up on the surfaces of the tools and within the wellbore. These compounds often precipitate upon pressure, temperature, and compositional changes resulting from blending or other mechanical or physicochemical processing. Such precipitation occurs in the wellbores, pipelines, valves, separators, pumps, and other equipment. Once precipitated, deposits can interfere with the normal function of the articles, block fluid flow, and decrease well production rates. The deposits may also necessitate repairs or replacements.

Various chemicals, such as scale inhibitors, wax inhibitors, and hydrate inhibitors have been used to prevent the formation of deposits from blocking or hindering fluid flow by squeeze treatment or by continuous injection of these chemicals into the well. Acids, chelates, and the like have also been used to break or dissolve certain deposits that are already formed.

Other techniques include forming a hydrophobic coating on critical areas of downhole tools. Exploration and production companies have also used remediation tools, such as abrasive jets and mechanical tools, to remove the deposits.

However, many existing techniques require costly well intervention, add up to non-productive time, or are sometimes not feasible or not effective for certain wells. Accordingly, an alternative method of treating a wellbore is continuously sought.

SUMMARY

A method of treating a wellbore comprises supporting a first tubular member in a housing; coupling a second tubular member to the first tubular member via a connector; the first tubular member, the second tubular member, or both comprising a chemical deployment modular device charged with a plurality of particulates preloaded with a well treatment additive; and deploying the first and second tubular members into the wellbore.

A downhole deployment system comprises a first tubular member; a second tubular member, at least one of the first tubular member and the second tubular member carrying a plurality of particulates preloaded with a well treatment additive; and a connector that couples the first tubular member to the second tubular member

BRIEF DESCRIPTION OF THE DRAWINGS

The following descriptions should not be considered limiting in any way. With reference to the accompanying drawings, like elements are numbered alike.

DETAILED DESCRIPTION

Figure 1:
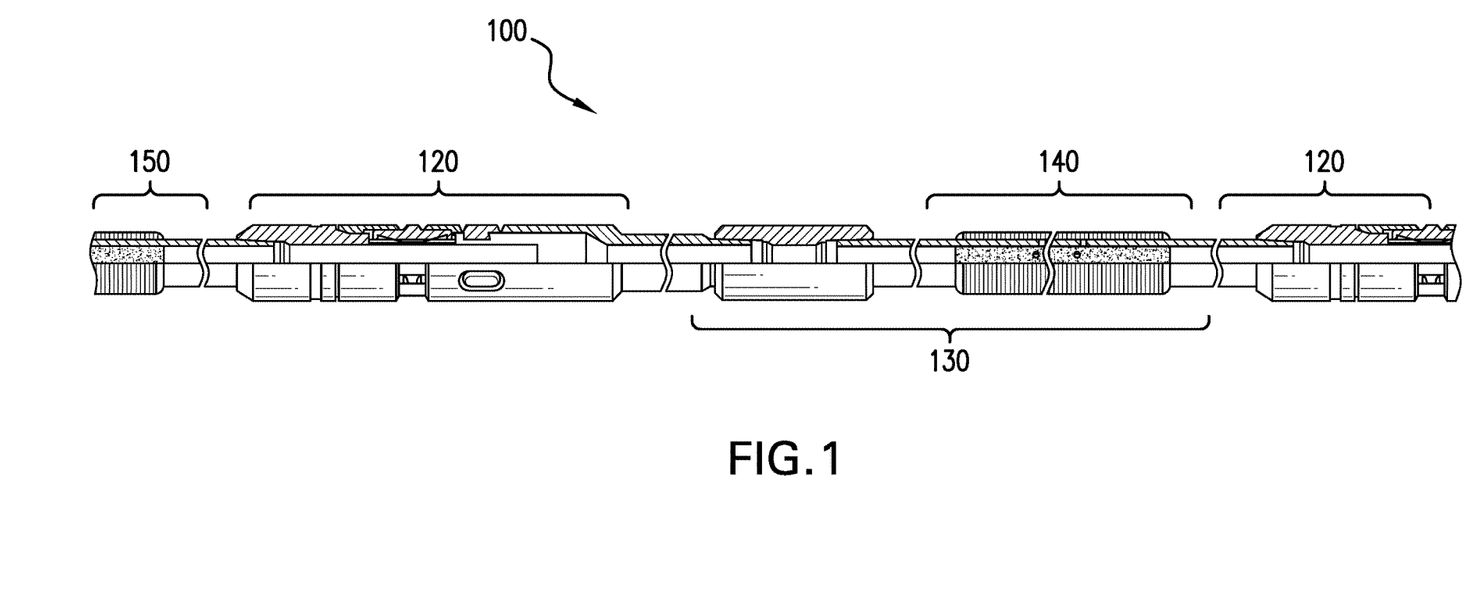
FIG. 1 is a schematic illustration of a downhole deployment system having a first tubular member and a second tubular member with a connector in between, wherein at least one of the first and second tubular members include a chemical deployment modular device.
Figure 5:
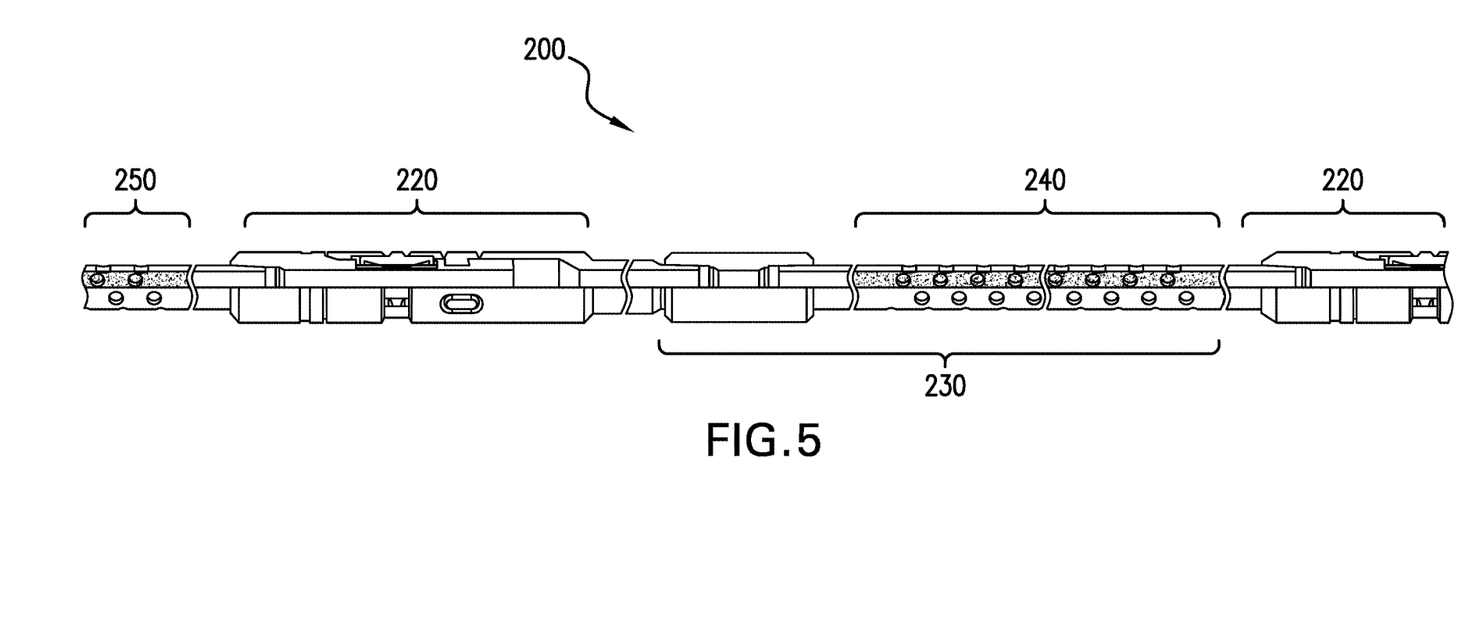
FIG. 5 is a schematic illustration of another downhole deployment system having a first tubular member and a second tubular member with a connector in between, wherein at least one of the first and second tubular members include a chemical deployment modular device.

Disclosed are methods and systems for treating wells using chemical deployment modular devices. Referring to FIGS. 1 and 5, a downhole deployment system (100, 200) comprises a first tubular member (130, 230), a second tubular member (150, 250), and a connector (120, 220) that couples the first tubular member (130, 230) to the second tubular member (150, 250). The first tubular member (130, 230), the second tubular member (150, 250), or both include a chemical deployment modular device (140, 240) that carries a plurality of rechargeable or non-rechargeable particulates (143, 243) preloaded with a well treatment additive.

Figure 2:
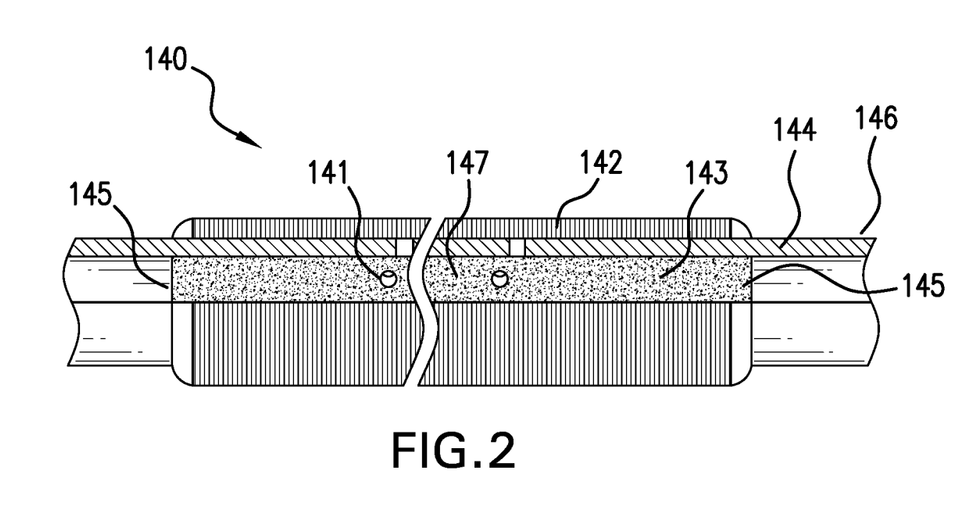
FIG. 2 shows the details of the chemical deployment modular device in FIG. 1.
Figure 6:
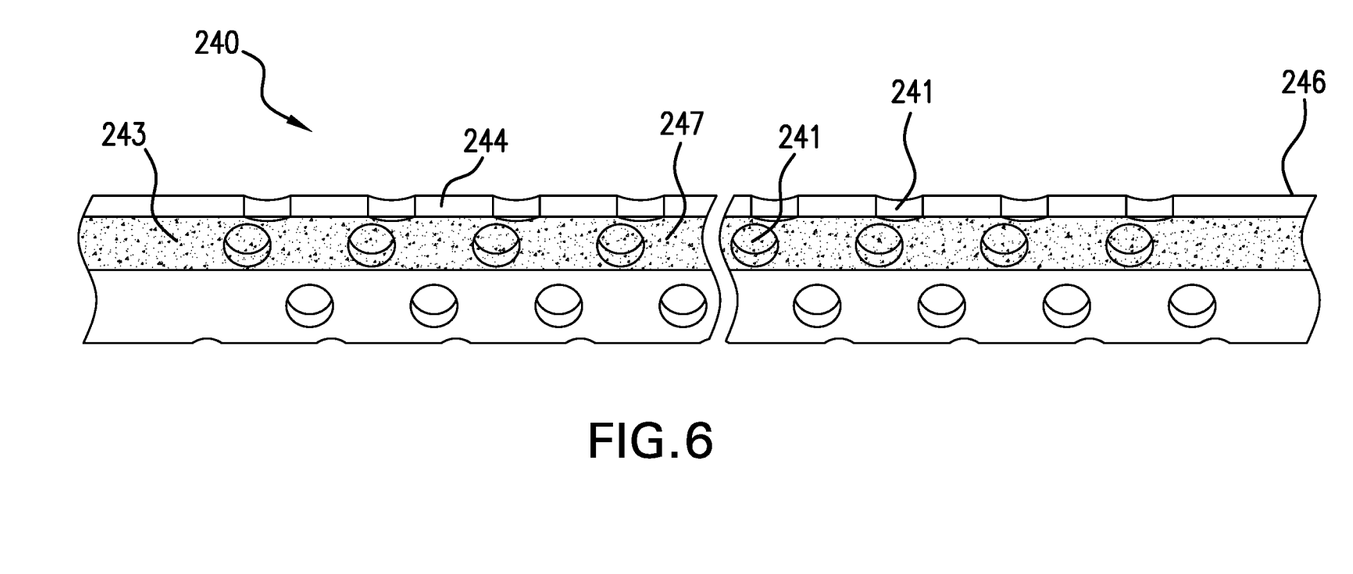
FIG. 6 shows the details of the chemical deployment modular device in FIG. 5.

The chemical deployment modular devices (140, 240) are illustrated in FIGS. 2 and 6. As shown in FIG. 2, the chemical deployment modular devices (140) comprise a tubular (146) having a wall (144) defining an interior space (147) inside the tubular. The wall (144) has a perforated or slotted portion, and a screen (142) is radially outwardly disposed of the perforated or slotted portion of the pipe wall (144). In the modular device, a plurality of particulates (143), which have been preloaded with well treatment additives, are retained in the interior space (147) of the tubular (146) between two barriers (145). The barriers (145) can be plates, discs, or other structures that, together with the wall of the tubular, are effective to retain the particulates. The size and shape of the openings (141) on the pipe wall (144) are not limited and can be selected to provide a substantial area for flow of wellbore fluids in and out of the interior space (147) of the tubular and to maintain the structural integrity of the tubular (146). The openings (141) on the pipe wall, the screen (142), and the size of the particulates (143) are also selected such that the particulates (143) remain in the interior space (147) of the tubular (146) when wellbore fluids flow around them. The well treatment additives, on the other hand, can be released to the wellbore fluids and treat the wellbore, such as reducing scaling as the well produces. The tubular (146) can have opposing threaded ends, which can be used to attach the tubular to other pipe strings or anchoring devices. Advantageously, the chemical deployment modular devices can be placed anywhere in the wellbore where the well can flow past the modular devices.

The screen in the chemical deployment modular devices is optional. The modular devices (240) shown in FIG. 6 include a tubular (246) with perforated or slotted pipe wall (244) defining an interior space (247), where a plurality of particulates (243) are disposed or packed in the interior space (247) inside the tubular (246) between two opposing barriers (not shown). The openings (241) on the pipe wall and the size of the particulates (243) are selected such that the particulates (243) are retained in the interior space (247) of the tubular (246) when wellbore fluids flow around them.

The particulates in the chemical deployment modular devices contain a water-insoluble adsorbent. Examples of water-insoluble adsorbents include activated carbon, silica particulate, precipitated silica, zeolite, ground walnut shells, fuller's earth, diatomaceous earth, and organic synthetic high molecular weight water-insoluble adsorbents such as polystyrene-divinylbenzene beads, and the like. The surface area of the water-insoluble adsorbents can be about 1 $m^2/g$ to about 100 $m^2/g$.

The well treatment additives that are preloaded on the particulates may include, for example, one or more scale inhibitors, paraffin inhibitors, hydrate inhibitors, asphaltene inhibitors, hydrogen sulfide scavengers, or a combination comprising at least one of the foregoing.

Examples of the scale inhibitors include, but are not limited to triethanolamine phosphate esters, and the like. Examples of paraffin inhibitors include, but are not limited to, paraffin crystal modifiers, dispersant/crystal modifier combinations, and the like. Particular paraffin crystal modifiers may include, for example, ethylene vinyl acetate polymer, fatty alcohol esters of olefin maleic anhydride copolymers, acrylate polymers of fatty alcohol esters, and the like. Hydrogen sulfide scavengers could include, for example, trihydroxyethyltriazine, and the like. Hydrate inhibitors could include, for example, polyethoxy polyamine, and the like. Asphaltene inhibitors include, for example, sorbitan monooleate, polyisobutylene succinic anhydride, and the like. Other known well treatment additives can also be used.

As used herein, "preloaded" or "loaded" means that the well treatment additives are adsorbed in the water-insoluble adsorbents. The proportion of water-insoluble adsorbents to treatment additives depends upon the additives selected and the performance desired for given geological formation and downhole environment. Generally speaking, the weight ratio of water-insoluble adsorbents to treatment additives will be in the range of about 95:5 to about 70:30, but can vary within or outside of this range for a given application and formation.

Figure 3:
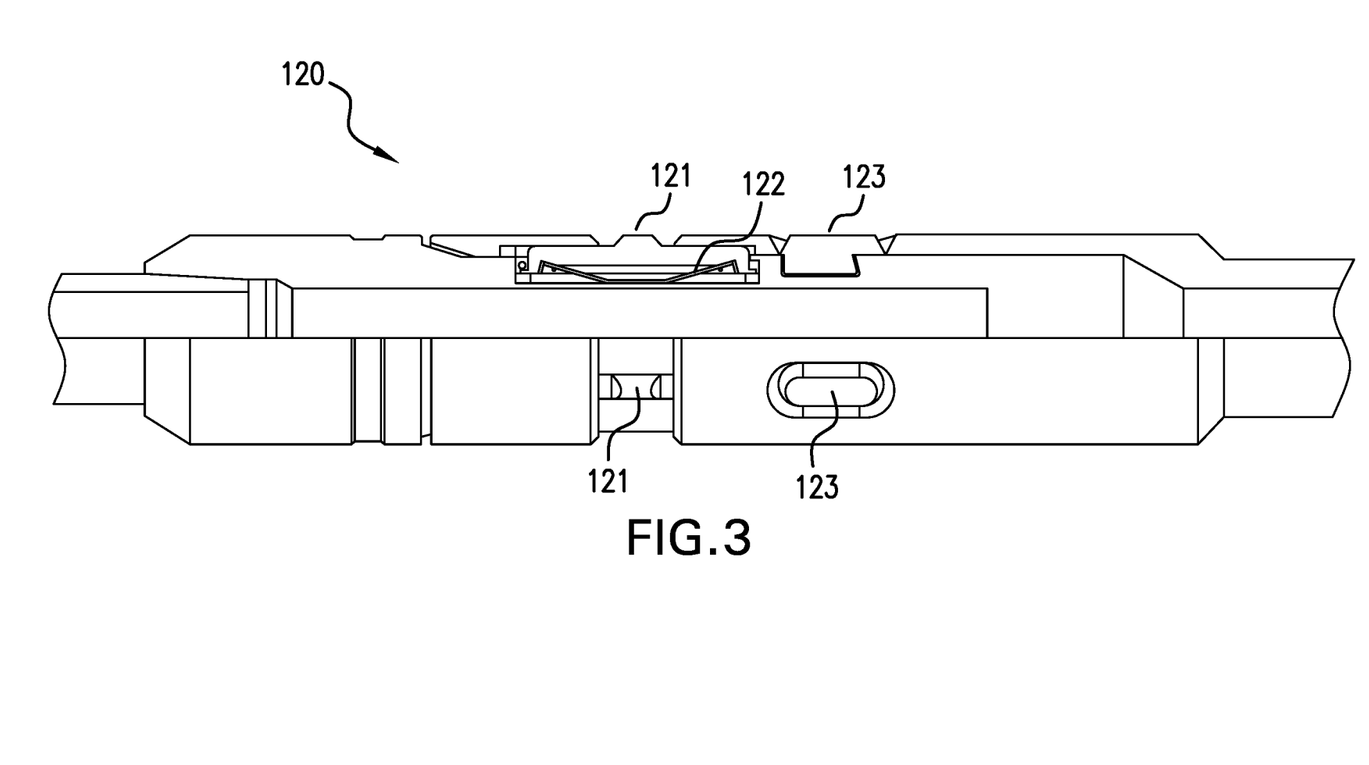
FIG. 3 shows the details of the connector in FIG. 1.
Figure 4:
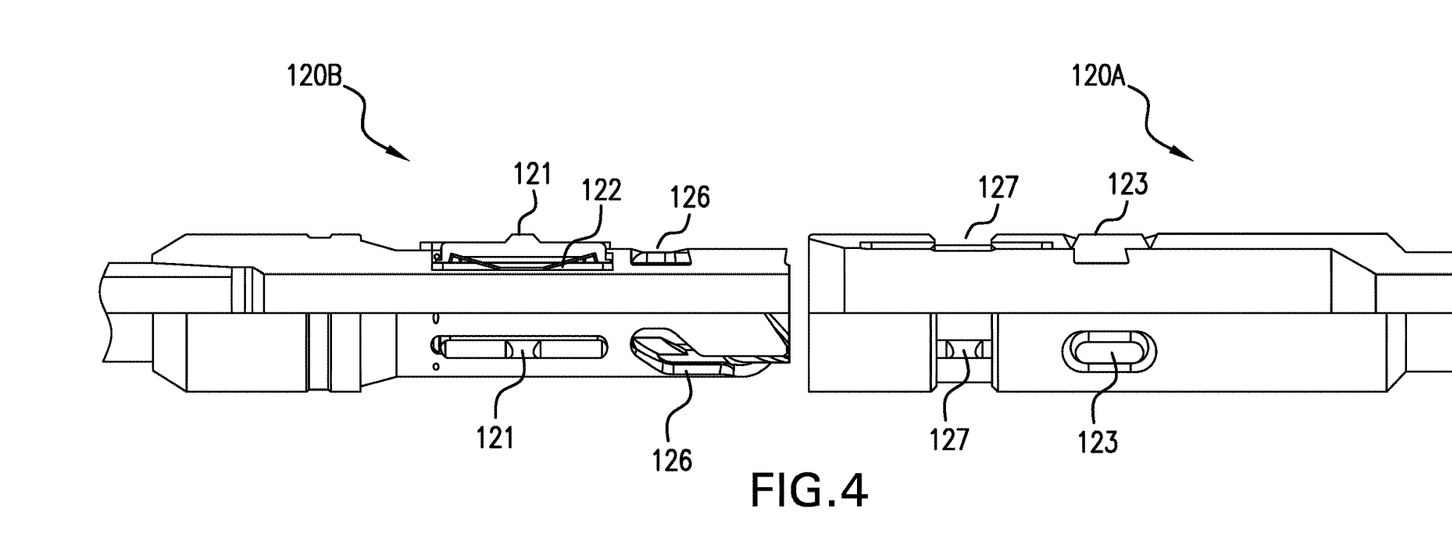
FIG. 4 is a disconnected view of the connector in FIG. 1.

An example of the connector used in the deployment systems (100, 200) are illustrated in FIGS. 3 and 4. The connector (120) includes a first body member (120A) mounted to the first tubular member (130, 230) and a second body member (120B) mounted to the second tubular member, the first and second body members engageable to each other to couple the first and second tubular members together within a housing. An example of the housing is a riser, which is a high pressure pipe fitted to the top of a wellhead or Christmas tree.

The first body member (120A) has an inwardly oriented lug (123) followed by a window (127). The second body member (120B) includes a latching key (121) and a recess (126) such as a J slot for receiving the lug (123). The key is disposed over a spring member (122) and extending outwardly from the second body member. The spring member facilitates the outward movement of the key (121) into the latching position shown in FIG. 3, when the key (121) is aligned with the window (127). More than one lugs, windows, latching keys, and recesses can be present.

Initially, the keys (121) are pushed radially inwardly to allow the second body member (120B) to slide into the first body member (120A). Then the keys (121) can spring out into the window (127), and meanwhile the lugs (123) extend into the receiving recesses (126) thus securing the first tubular member (130, 230) to the second tubular member (150, 250). In an embodiment, the latching procedure is accomplished exclusively with setting down weight on the first tubular member (130, 230). Disengagement is accomplished by compressing latching keys (121) and pulling the second tubular member (150, 250) so that the keys (121) and lugs (123) are out of engagement with the corresponding receiving windows (127) and recesses (126).

The deployment systems (100, 200) as disclosed herein can be used to convey chemicals into a pressurized or unpressurized wellbore. The method includes supporting a first tubular member (130, 230) in a housing such as a riser, coupling a second tubular member (150, 250) to the first tubular member (130, 230) via a connector (120, 220), optionally pressurizing the housing to a wellbore pressure, and allowing the first and second tubular members to be deployed into the wellbore, wherein the first tubular member (130, 230), the second tubular member (150, 250), or both include a chemical deployment modular device (140, 240) that carries a plurality of particulates (143, 243) preloaded with a well treatment additive.

Figure 7:
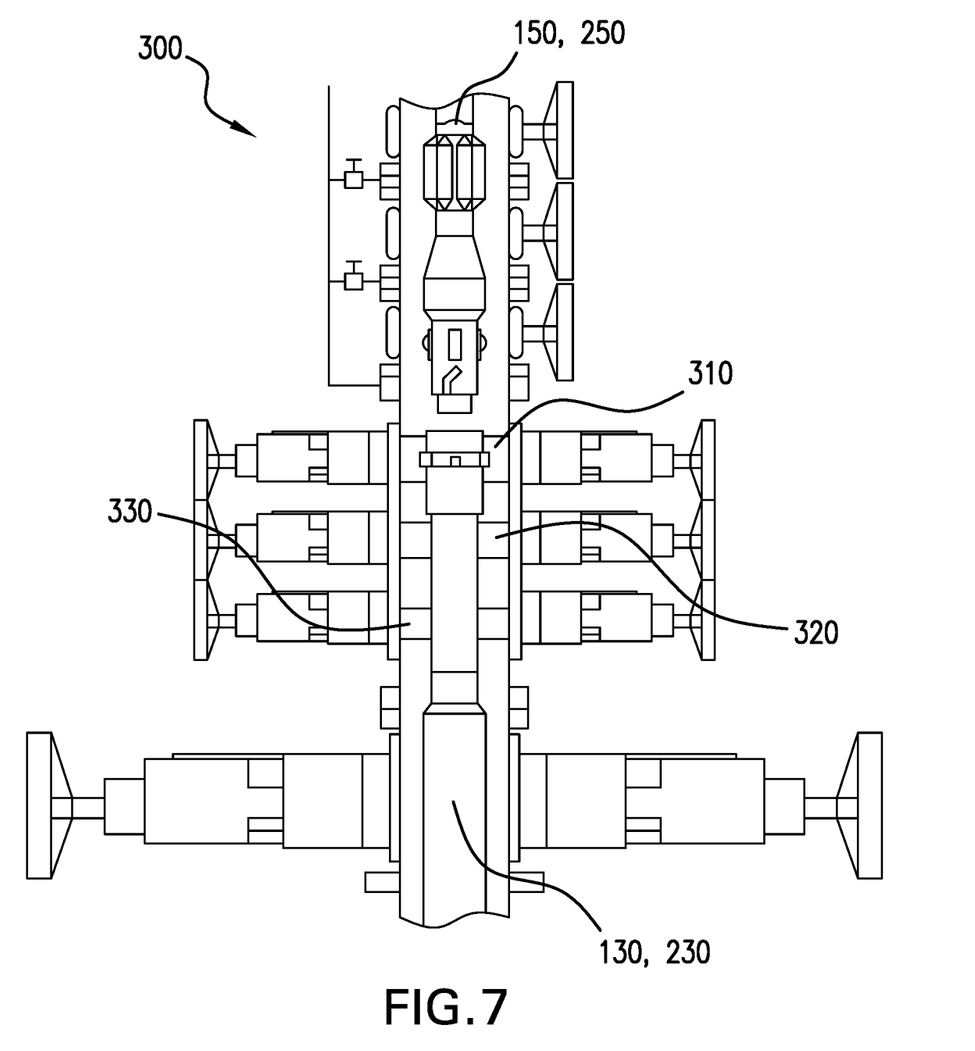
FIG. 7 shows a second tubular member to be coupled to a first tubular member in a blowout preventer.
Figure 8:
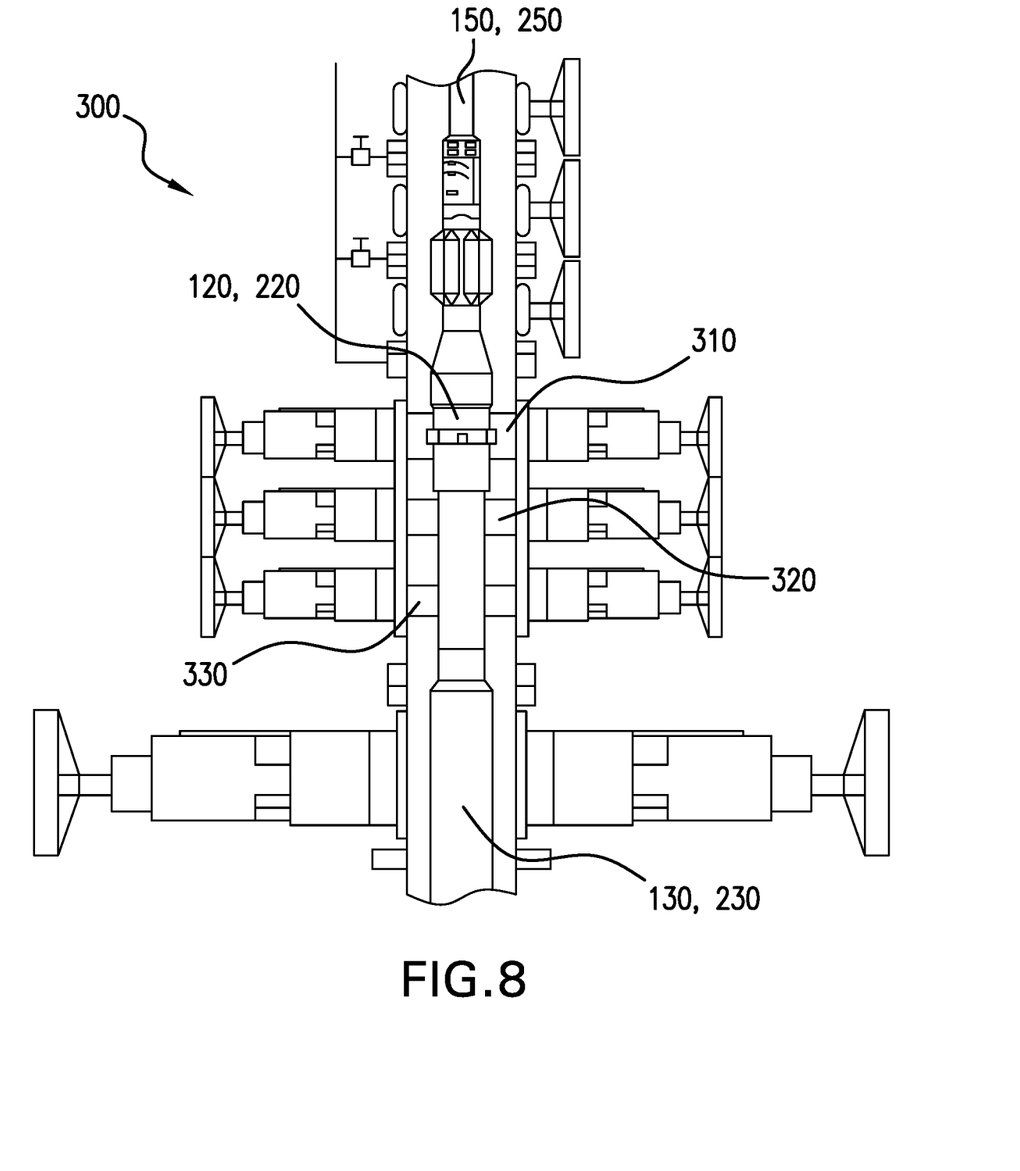
FIG. 8 shows that the first and second tubular members in FIG. 7 are latched together in the blowout preventer.

In use, the strings of tubulars can be inserted as follows. A running tool (not shown) is latched into a first tubular member (130, 230) via a connector (120, 220). Then the first tubular (130, 230) is run-in with the running tool until the running tool is positioned across a blowout preventer (300) and bottoms on no-go rams (320), at which point a seal and/or slip rams (330) hold or support the first tubular member (130, 230) while operation of disconnect rams (310) installed in the blowout preventer allows the running tool to disengage from the first tubular member (130, 230) for removal from the housing. Next, a second tubular member (150, 250) is picked up outside the housing by the running tool with the same latching mechanism illustrated in FIGS. 3 and 4. The lower end of the second tubular member (150, 250) also has its own set of latching keys (121) and recesses (126). The second tubular member (150, 250) is then coupled to the first tubular member (130, 230) via connector (120, 220) by set down weight on the running tool as shown in FIGS. 7 and 8. With the seal and/or slip rams (330), no-go rams (320), and disconnect rams (310) are released, the running tool is run in hole through the blowout preventer (300) until the no-go rams (320) are positioned on the second tubular member (150, 250). The process is then repeated to add more tubular members.

Once the chemical deployment modular devices are positioned at the desired downhole locations, the method can further include flowing a wellbore fluid about the plurality of the particulates to release the well treatment additive to the wellbore fluid. The released additives can thus treat the wellbore, for example, reducing scaling.

Optionally, the particulates in the deployment modular devices can be recharged while in the wellbore thus removing the need to recover and then redeploy the system at a later date. As used herein, "recharged" means that additional well treatment additives are loaded or adsorbed by the particulates. The additional treatment additives can be the same or different from the preloaded additives.

The particulates in the modular devices can be recharged any time after the initially loaded well treatment additives have been substantially depleted so that the treatment additive performance level has become unacceptable or when new additives are needed for improved performance. The particulates can be recharged by circulating a treatment fluid containing the desired additional well treatment additives in the wellbore.

In addition to the additional treatment additives, the treatment fluid can contain a solvent. The relative amounts of the solvent and treatment additives can vary depending upon the additive and solvent involved. In an embodiment, the weight ratio of the solvent relative to the treatment additives is in the range of about 10:90 to about 95:5. The solvent can be an organic solvent such as xylenes, toluene, or a heavy aromatic distillate and possible mixtures of all three or water when water soluble or dispersible well treatment additives are used.

The deployment systems as disclosed herein allow virtually any length assembly to be deployed with any number of chemical deployment modular devices desired. In addition, the interruption caused by killing a well and bringing the well back online can be minimized because the modular devices carrying the particulates preloaded with well treatment additives can be conveyed into a live well. Further, the modular devices can be selectively deployed to predetermined positions such that when a wellbore fluid flows about the modular devices, the treatment additives can be continuously released thus providing sustained treatment to the wellbore. Meanwhile, the particulates in the modular devices can be recharged while in the well thus removing the need to recover and redeploy the devices.

Set forth below are various embodiments of the disclosure.

Embodiment 1

A method of treating a wellbore, the method comprising: supporting a first tubular member in a housing; coupling a second tubular member to the first tubular member via a connector; the first tubular member, the second tubular member, or both comprising a chemical deployment modular device charged with a plurality of particulates preloaded with a well treatment additive; and deploying the first and second tubular members into the wellbore.

Embodiment 2

The method as in any prior embodiment, wherein the chemical deployment modular device comprises a tubular having a wall defining an interior space, the wall having a perforated or slotted portion, and the particulates are disposed in the interior space of the tubular between a first barrier and a second barrier.

Embodiment 3

The method as in any prior embodiment, wherein the chemical deployment modular device further comprises a screen radially outwardly disposed of the perforated or slotted portion of the pipe wall.

Embodiment 4

The method as in any prior embodiment, further comprising flowing a wellbore fluid about the plurality of the particulates to release the well treatment additive to the wellbore fluid.

Embodiment 5

The method as in any prior embodiment, further comprising recharging the plurality of the particulates with an additional well treatment additive.

Embodiment 6

The method as in any prior embodiment, wherein recharging the plurality of the particulates comprises circulating a treatment fluid comprising the additional well treatment additive in the wellbore.

Embodiment 7

The method as in any prior embodiment, wherein the chemical deployment modular device is deployed into a live well.

Embodiment 8

The method as in any prior embodiment, wherein the chemical deployment modular device is deployed into a dead well.

Embodiment 9

The method as in any prior embodiment, further comprising pressurizing the housing to a wellbore pressure before deploying the first and second tubular members into the wellbore.

Embodiment 10

The method as in any prior embodiment, wherein the particulates comprise activated carbon, silica particulate, precipitated silica, zeolite, ground walnut shells, fuller's earth, polystyrene-divinylbenzene, diatomaceous earth, or a combination comprising at least one of the foregoing.

Embodiment 11

The method as in any prior embodiment, wherein the well treatment additive comprises scale inhibitors, paraffin inhibitors, hydrate inhibitors, asphaltene inhibitors, hydrogen sulfide scavengers, or a combination comprising one or more of the foregoing.

Embodiment 12

A downhole deployment system comprising: a first tubular member; a second tubular member, at least one of the first tubular member and the second tubular member carrying a plurality of particulates preloaded with a well treatment additive; and a connector that couples the first tubular member to the second tubular member.

Embodiment 13

The downhole deployment system as in any prior embodiment, wherein the first tubular member, the second tubular member, or both comprise a chemical deployment modular device, the chemical deployment modular device comprising a tubular having a wall defining an interior space inside the tubular, the wall having a perforated or slotted portion, and the plurality of particulates disposed in the interior space of the tubular between a first barrier and a second barrier.

Embodiment 14

The downhole deployment system as in any prior embodiment, wherein the chemical deployment modular device further comprises a screen radially outwardly disposed of the perforated or slotted pipe wall.

Embodiment 15

The downhole deployment system as in any prior embodiment, wherein the connector comprises a first body member mounted to the first tubular member and a second body member mounted to the second tubular member, the first and second body members engageable to each other to couple the first and second tubular members together within a housing.

Embodiment 16

The downhole deployment system as in any prior embodiment, wherein the first body member comprises a window, and the second body member comprises a latching key disposed on a spring member and extending outwardly from the second body member, the latching key being aligned with the window when the first body member engages the second body member.

Embodiment 17

The downhole deployment system as in any prior embodiment, wherein the first body member further comprises a lug extending inwardly from the first body member; and the second body member further comprises a recess for receiving the lug.

Embodiment 18

The downhole deployment system as in any prior embodiment, wherein the particulates comprise activated carbon, silica particulate, precipitated silica, zeolite, ground walnut shells, fuller's earth, polystyrene-divinylbenzene, diatomaceous earth, or a combination comprising at least one of the foregoing.

Embodiment 19

The downhole deployment system as in any prior embodiment, wherein the well treatment additive comprises scale inhibitors, paraffin inhibitors, hydrate inhibitors, asphaltene inhibitors, hydrogen sulfide scavengers, or a combination comprising one or more of the foregoing.

All ranges disclosed herein are inclusive of the endpoints, and the endpoints are independently combinable with each other. As used herein, "combination" is inclusive of blends, mixtures, alloys, reaction products, and the like. The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with the term can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of treating a wellbore, the method comprising:
   supporting a first tubular member in a housing;
   coupling a second tubular member to the first tubular member via a connector to form a downhole deployment system, at least one of the first tubular member and the second tubular member carrying a plurality of particulates preloaded with a well treatment additive; and
   deploying the first and second tubular members into the wellbore,
   wherein the first tubular member, the second tubular member, or both comprise a chemical deployment modular device, which comprises
      a tubular having a wall defining an interior space inside the tubular, the wall having a perforated or slotted portion, and
      the plurality of particulates disposed in the interior space of the tubular between a first barrier and a second barrier.

2. The method of claim 1, wherein the chemical deployment modular device further comprises a screen radially outwardly disposed of the perforated or slotted portion of the pipe wall.

3. The method of claim 1, further comprising flowing a wellbore fluid about the plurality of the particulates to release the well treatment additive to the wellbore fluid.

4. The method of claim 1, further comprising recharging the plurality of the particulates with an additional well treatment additive.

5. The method of claim 4, wherein recharging the plurality of the particulates comprises circulating a treatment fluid comprising the additional well treatment additive in the wellbore.

6. The method of claim 1, wherein the chemical deployment modular device is deployed into a live well or a dead well.

7. The method of claim 1, further comprising pressurizing the housing to a wellbore pressure before deploying the first and second tubular members into the wellbore.

8. The method of claim 1, wherein the particulates comprise activated carbon, silica particulate, precipitated silica, zeolite, ground walnut shells, fuller's earth, polystyrene-divinylbenzene, diatomaceous earth, or a combination comprising at least one of the foregoing.

9. The method of claim 8, wherein the well treatment additive comprises scale inhibitors, paraffin inhibitors, hydrate inhibitors, asphaltene inhibitors, hydrogen sulfide scavengers, or a combination comprising one or more of the foregoing.

10. A downhole deployment system comprising:
    a first tubular member;
    a second tubular member, at least one of the first tubular member and the second tubular member carrying a plurality of particulates preloaded with a well treatment additive; and
    a connector that couples the first tubular member to the second tubular member,
    wherein the first tubular member, the second tubular member, or both comprise a chemical deployment modular device, which comprises
    a tubular having a wall defining an interior space inside the tubular, the wall having a perforated or slotted portion, and
    the plurality of particulates disposed in the interior space of the tubular between a first barrier and a second barrier.

11. The downhole deployment system of claim 10, wherein the chemical deployment modular device further comprises a screen radially outwardly disposed of the perforated or slotted pipe wall.

12. The downhole deployment system of claim 10, wherein the connector comprises
    a first body member mounted to the first tubular member and
    a second body member mounted to the second tubular member,
    the first and second body members engageable to each other to couple the first and second tubular members together within a housing.

13. The downhole deployment system of claim 10, wherein the particulates comprise activated carbon, silica particulate, precipitated silica, zeolite, ground walnut shells, fuller's earth, polystyrene-divinylbenzene, diatomaceous earth, or a combination comprising at least one of the foregoing.

14. The downhole deployment system of claim 13, wherein the well treatment additive comprises scale inhibitors, paraffin inhibitors, hydrate inhibitors, asphaltene inhibitors, hydrogen sulfide scavengers, or a combination comprising one or more of the foregoing.

15. A downhole deployment system comprising:
    a first tubular member;
    a second tubular member, at least one of the first tubular member and the second tubular member carrying a plurality of particulates preloaded with a well treatment additive; and
    a connector that couples the first tubular member to the second tubular member,
    wherein
    the connector comprises
    a first body member mounted to the first tubular member and
    a second body member mounted to the second tubular member,
    the first and second body members engageable to each other to couple the first and second tubular members together within a housing,
    the first body member comprises a window, and the second body member comprises a latching key disposed on a spring member and extending outwardly from the second body member, the latching key being aligned with the window when the first body member engages the second body member.

16. The downhole deployment system of claim 15, wherein
    the first tubular member, the second tubular member, or both comprise a chemical deployment modular device,
    the chemical deployment modular device comprising
    a tubular having a wall defining an interior space inside the tubular, the wall having a perforated or slotted portion, and
    the plurality of particulates disposed in the interior space of the tubular between a first barrier and a second barrier.

17. The downhole deployment system of claim 15, wherein
    the first body member further comprises a lug extending inwardly from the first body member; and
    the second body member further comprises a recess for receiving the lug.

18. The downhole deployment system of claim 15, wherein the chemical deployment modular device further comprises a screen radially outwardly disposed of the perforated or slotted pipe wall.

19. The downhole deployment system of claim 15, wherein the connector comprises
    a first body member mounted to the first tubular member and
    a second body member mounted to the second tubular member,
    the first and second body members engageable to each other to couple the first and second tubular members together within a housing.

20. The downhole deployment system of claim 19, wherein the first body member comprises a window, and the second body member comprises a latching key disposed on a spring member and extending outwardly from the second body member, the latching key being aligned with the window when the first body member engages the second body member.

* * * * *